(12) United States Patent
Rivera et al.

(10) Patent No.: US 7,941,847 B2
(45) Date of Patent: May 10, 2011

(54) METHOD AND APPARATUS FOR PROVIDING A SECURE SINGLE SIGN-ON TO A COMPUTER SYSTEM

(75) Inventors: David Rivera, Durham, NC (US); David C. Challener, Raleigh, NC (US); William F. Keown, Jr., Raleigh, NC (US); Joseph M. Pennisi, Apex, NC (US); Randall S. Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1251 days.

(21) Appl. No.: 11/535,110

(22) Filed: Sep. 26, 2006

(65) Prior Publication Data

US 2008/0077986 A1  Mar. 27, 2008

(51) Int. Cl.
*G06F 7/04* (2006.01)
(52) U.S. Cl. .................................. 726/20; 726/8; 726/9
(58) Field of Classification Search .................. 713/182; 726/8, 20, 5, 9
See application file for complete search history.

(56) References Cited

U.S. PATENT DOCUMENTS

| | | | |
|---|---|---|---|
| 5,610,981 A | 3/1997 | Mooney et al. | |
| 6,351,817 B1 | 2/2002 | Flyntz | |
| 6,668,322 B1 | 12/2003 | Wood et al. | |
| 2001/0045451 A1 | 11/2001 | Tan et al. | |
| 2003/0188179 A1* | 10/2003 | Challener et al. | 713/193 |
| 2003/0196106 A1 | 10/2003 | Erfani et al. | |
| 2004/0210758 A1 | 10/2004 | Jang et al. | |
| 2007/0169174 A1* | 7/2007 | Critten et al. | 726/3 |

* cited by examiner

*Primary Examiner* — Emmanuel L Moise
*Assistant Examiner* — Ali S Abyaneh
(74) *Attorney, Agent, or Firm* — Antony P. Ng; Dillon & Yudell LLP

(57) ABSTRACT

A method for providing a secure single sign-on to a computer system is disclosed. Pre-boot passwords are initially stored in a secure storage area of a smart card. The operating system password, which has been encrypted to a blob, is stored in a non-secure area of the smart card. After the smart card has been inserted in a computer system, a user is prompted for a Personal Identification Number (PIN) of the smart card. In response to a correct smart card PIN entry, the blob stored in the non-secure storage area of the smart card is decrypted to provide the operating system password, and the operating system password along with the pre-boot passwords stored in the secure storage area of the smart card are then utilized to log on to the computer system.

12 Claims, 3 Drawing Sheets

METHOD AND APPARATUS FOR PROVIDING A SECURE SINGLE SIGN-ON TO A COMPUTER SYSTEM

BACKGROUND OF THE INVENTION

1. Technical Field

The present invention relates to computer security in general, and, in particular, to a method and apparatus for providing security management in computer systems. Still more particularly, the present invention relates to a method and apparatus for providing a secure single sign-on to a computer system.

2. Description of Related Art

Today, in order to log on to a secured personal computer system, a computer user is required to enter a power-on password (POP) before computer boot, a hard-drive password (HDP) to allow the basic input/output system (BIOS) to boot the operating system, and an operating system password to log onto the operating system. Additionally, if the computer user uses a smart card, the computer user is also required to enter a smart card personal identification number to allow access to the protected information on the smart card after the computer user has logged on to the personal computer system. Thus, there are potentially four different passwords a computer user has to remember, which most computer users would find annoying. Besides, the likelihood of misplacing passwords is higher with more passwords.

Most computer users tend to prefer the number of passwords they need to enter for logging onto a secured personal computer system to be reduced. Almost all computer users prefer the time from a computer system being turned on to the time the computer system being ready to use to be as short as possible.

Consequently, it would be desirable to provide an improved method and apparatus for providing a secure single sign-on to a computer system.

SUMMARY OF THE INVENTION

In accordance with a preferred embodiment of the present invention, pre-boot passwords are initially stored in a secure storage area of a smart card. The operating system password, which has been encrypted to a blob, is stored in a non-secure area of the smart card. After the smart card has been inserted in a computer system, a user is prompted for a Personal Identification Number (PIN) of the smart card. In response to a correct smart card PIN entry, the blob stored in the non-secure storage area of the smart card is decrypted to provide the operating system password, and the operating system password along with the pre-boot passwords stored in the secure storage area of the smart card are then utilized to log on to the computer system.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
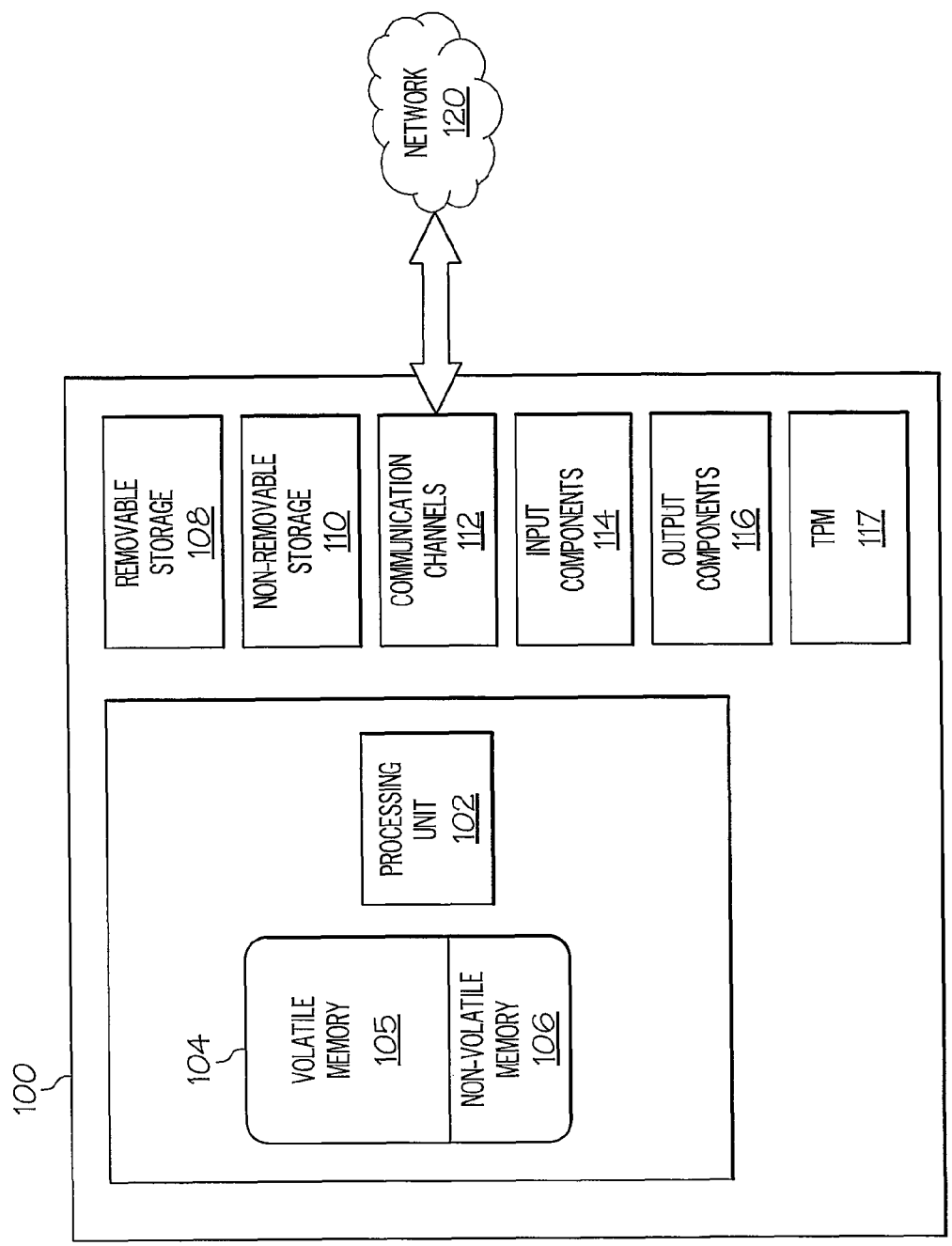
FIG. 1 is a block diagram of a computer system in which a preferred embodiment of the present invention is incorporated.

Referring now to the drawings and in particular to FIG. 1, there is depicted a block diagram of a computer system in which a preferred embodiment of the present invention is incorporated. As shown, a computer system 100 includes a processing unit 102 and a memory 104. Memory 104 includes a volatile memory 105 (such as a random access memory) and a non-volatile memory 106 (such as a read-only memory). Computer system 100 also contains removable storage media devices 108, such as compact discs, optical disks, magnetic tapes, etc., and non-removable storage devices 110, such as hard drives. In addition, computer system 100 may contain communication channels 112 for providing communications with other computer systems on a network 120. Computer system 100 may also have input components 114 such as a keyboard, mouse, etc., and output components 116 such as displays, speakers, printers, etc.

A Trusted Platform Module (TPM) 117 is included within computer system 100 to provide secure generations of cryptographic keys, and limits the use of those keys to either signing/verification or encryption/decryption, as it is known to those skilled in the art. TPM 117 can be utilized to ensure that data being used to grant access to the operating system of computer system 100 is maintained securely.

When a computer user wants to access a computer, such as computer system 100, the system BIOS prompt the computer user for a smart card personal identification number (PIN) entry. Upon successful verification of the provided PIN of the smart card, the pre-boot password(s) of the computer user can be retrieved from a secure storage area of the smart card. The pre-boot password(s) can then be used to allow the computer system to boot. Once the verification has been completed, the operating system should be able to trust that the computer user has been authenticated and be able to safely retrieve the operating system logon credentials. Platform Configuration Register (PCRs) of a TPM provide a mechanism for such trust to be established. The logon credentials for an operating system can be sealed to a PCR such that the data in the PCR can only be unsealed after a valid smart card PIN has been provided by the computer user.

Two steps are preferably required to maintain a secure single sign-on: initial setup and normal usage. During the initial setup, the pre-boot password is recorded into a protected area of a pre-initialized smart card, and the operating system password is converted into a TPM-encrypted binary large object (blob) to be stored on a smart card. During the normal usage, the pre-boot password is retrieved from the smart card to allow computer boot, and the encrypted operating system password is used for logging onto the operating system.

The following description is based on a personal computer system having the Windows® operating system manufactured by the Microsoft® corporation; however, it is understood by those skilled in the art that the present invention is applicable to a personal computer using any operating system. For the Microsoft® Windows® operating system, the operating logon process is defined in the Graphical Identification and Authentication (GINA) interface.

Setup Process

Figure 2:
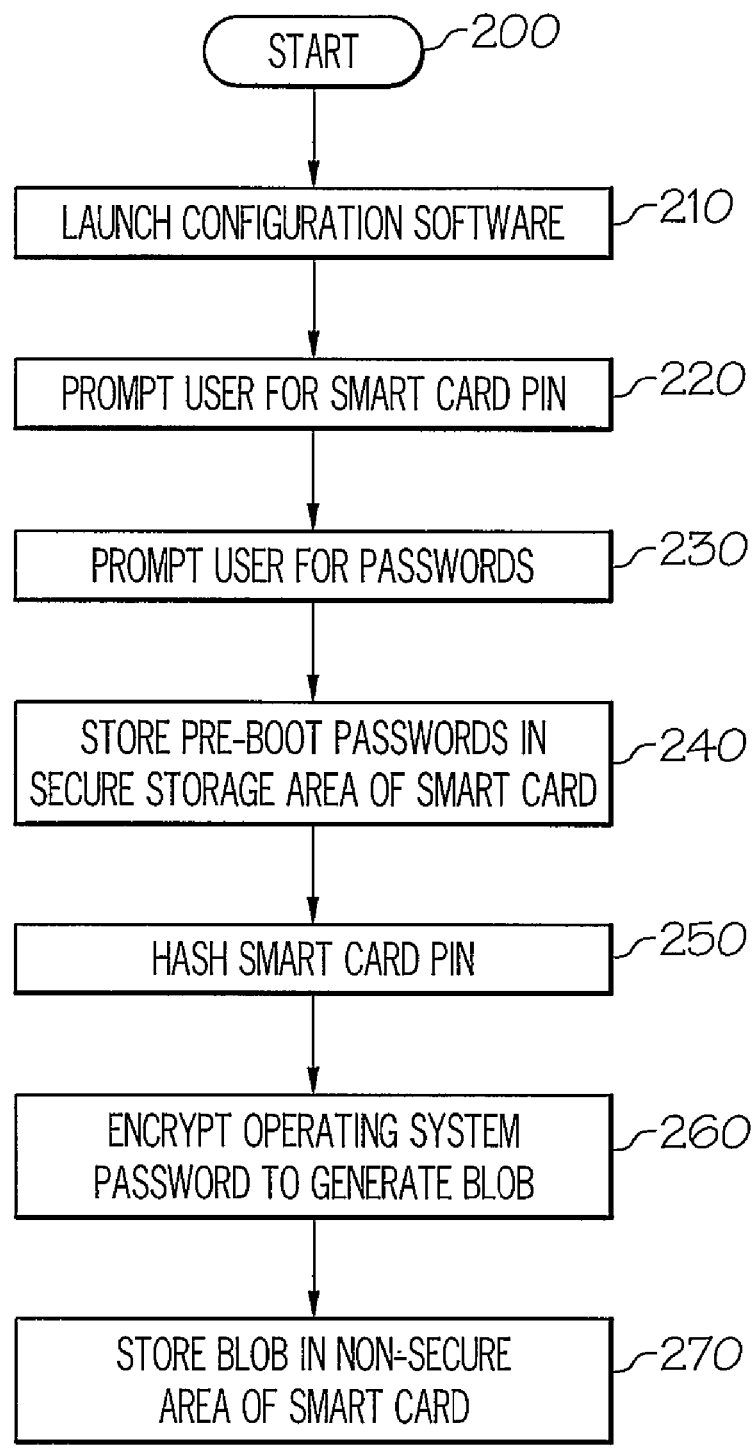
FIG. 2 is a high-level logic flow diagram of a method for setting up a secure single sign-on to a computer system, in accordance with a preferred embodiment of the present invention.

With reference now to FIG. 2, there is depicted a high-level logic flow diagram of a method for setting up a secure single sign-on to a computer system, in accordance with a preferred embodiment of the present invention. Starting at 200, a computer user logs on to a computer system using an operating system password as usual, and the secure single sign-on configuration software is then launched, as depicted in block 210. After a smart card has been inserted by the computer user to a smart card reader associated with the computer system, the computer user is prompted by the configuration software for a smart card PIN, as shown in block 220. A successful smart card PIN entry by the computer user unlocks the secure storage area within the smart card. Then, the computer user is prompted by the configuration software for various passwords that are required to log on to the computer system, as depicted in block 230. The various passwords may include pre-boot passwords and operating system password. The pre-boot passwords, such as power-on password (POP) and hard-drive password (HDP), are written to the secure storage area of the smart card, as shown in block 240. The secure storage area of the smart card can be locked after all the pre-boot passwords have been entered by the computer user.

The smart card PIN is hashed using the TPM Extend command to a PCR, as shown in block 250. The operating system password is encrypted using the TPM Seal command to the PCR to generate an encrypted blob, as depicted in block 260. The encrypted blob is then stored in the non-secured area of the smart card, as shown in block 270.

Usage Process

Figure 3:
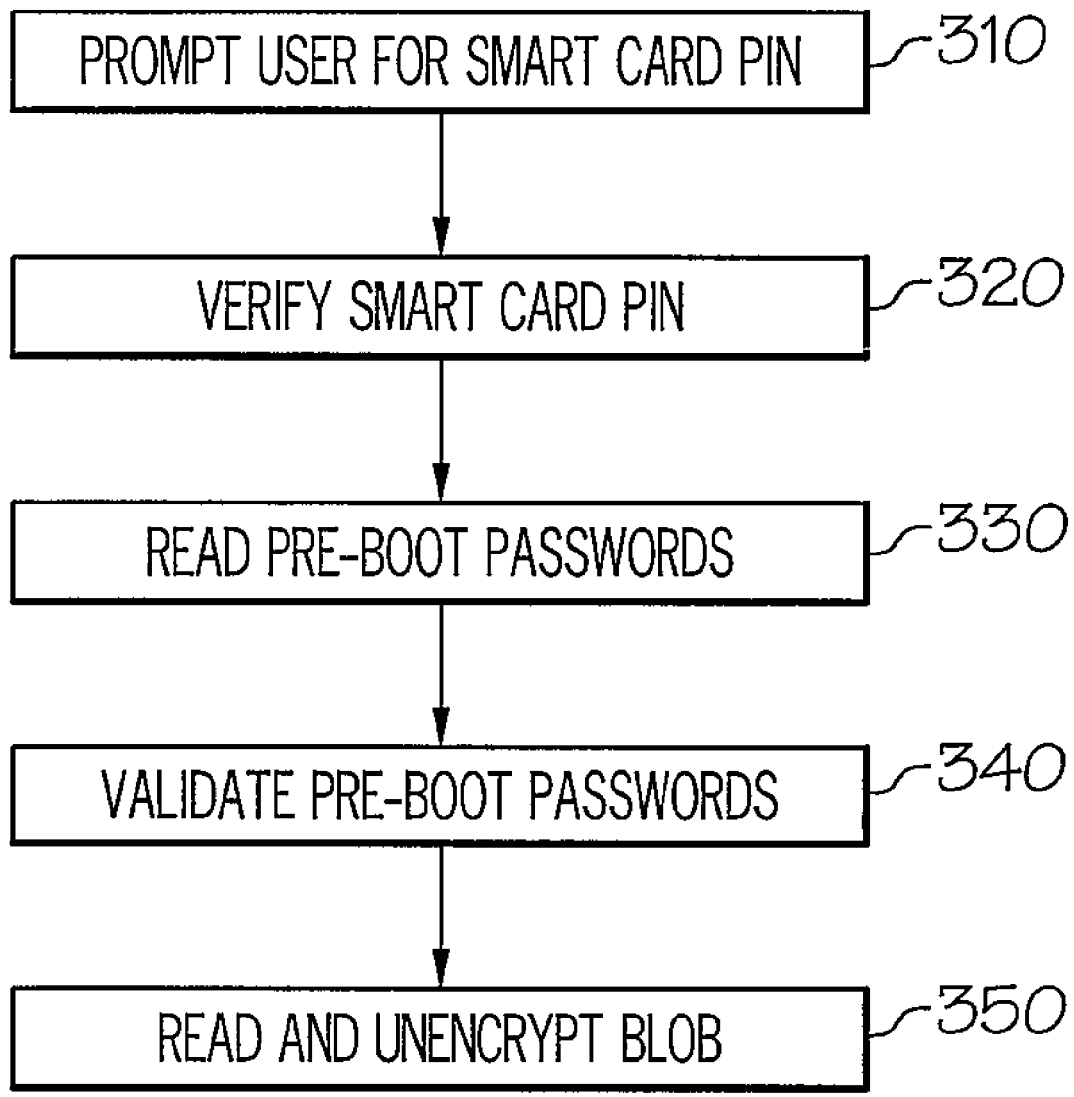
FIG. 3 is a high-level logic flow diagram of a method for using a secure single sign-on to a computer system, in accordance with a preferred embodiment of the present invention.

Referring now to FIG. 3, there is illustrated a high-level logic flow diagram of a method for using a secure single sign-on, in accordance with a preferred embodiment of the present invention. Initially, a computer user is prompted for a smart card and its PIN after the computer system has been turned on, as shown in block 310. The smart card PIN is then verified with the smart card, as depicted in block 320, and a successful smart card PIN entry unlocks the secure storage area of the smart card.

Pre-boot passwords are then read from the secure storage area of the smart card, as shown in block 330, and the secure storage area of the smart card can then be locked again. The BIOS validates the pre-boot passwords using well-known methods, as depicted in block 340, and continues with the boot up process.

The operating system logon process then reads the encrypted blob from the non-secure area of the smart card, and decrypts the blob to yield the operating system password, as depicted in block 350. Only a valid smart card PIN entry allows this data to be unsealed, and the operating system measurements assure that only the expected operating system configuration allows such data to be; decrypted; thus, unauthorized usage of this data by some other boot source can be prevented. The operating system password can then be used for normal operating system logon.

The single sign-on process will be affected by a change in the smart card PIN, the pre-boot password(s), or the operating system logon password. In the event that the PIN changes, the decryption of the data in the PCR by the operating system logon process will fail. When this occurs, the logon process can assume that a change in the smart card PIN had occurred, and the software code used in the above-described setup process can be executed again automatically, forcing an update to the encrypted blob as described in the setup process. After completion of the re-execution, the operating system password can be successfully decrypted in subsequent boot ups, as described in the above-described usage process.

In the event the pre-boot password(s) are changed, the BIOS will not be able to successfully authenticate the pre-boot password(s) on the smart card. The computer system should then prompt for entry of the current pre-boot password (s), validate, and update the pre-boot password(s) that are stored in the secure area of the smart card.

If the operating system logon password has changed, the operating system logon code that decrypt the encrypted blob will get a failure from the operating system, which indicates an invalid operating system password was provided. When this occurs, the logon process can allow the setup process to be executed again, forcing the computer user to re-enter the smart card PIN and the operating system password again. This will update the encrypted blob, and on subsequent boots, the correct operating system password can be retrieved using the usage process.

As has been described, the present invention provides a method and apparatus for providing a secure single sign-on to a computer system. The present invention provides a secure and trusted path for the BIOS to retrieve pre-boot authentication data from a smart card, and allows the operating system to retrieve the logon credentials from the smart card using an embedded security chip to provide the foundation of trust and security in the transaction.

The usage of a smart card also allows a computer user to use a single sign-on capability on multiple computer systems. Any computer system configured with the same pre-boot passwords can be accessed by the computer user having the same smart card, which would be beneficial in a domain roaming environment. A computer user can use his/her smart card to gain access to all the computer systems by entering a smart card PIN once.

It is also important to note that although the present invention has been described in the context of a fully functional computer system, those skilled in the art will appreciate that the mechanisms of the present invention are capable of being distributed as a program product in recordable type media such as compact discs.

While the invention has been particularly shown and described with reference to a preferred embodiment, it will be understood by those skilled in the art that various changes in form and detail may be made therein without departing from the spirit and scope of the invention.

What is claimed is:

1. A method for providing a secure single sign-on to a computer system, said method comprising:
    storing pre-boot passwords in a secure storage area of a smart card;
    encrypting an operating system password to generate a blob, and storing said blob in a non-secure area of said smart card;
    prompting for a smart card personal identification number (PIN) of said smart card after said smart card has been inserted in said computer system;
    in response to a correct smart card PIN entry, utilizing said pre-boot passwords stored in said secure storage area and said operating system password encrypted within said blob to log on to said computer system.

2. The method of claim 1, wherein said encrypting further includes encrypting said operating system password using a trusted platform module (TPM) Seal command to a platform configuration register (PCR).

3. The method of claim 2, wherein said utilizing further includes decrypting said blob to yield said operating system password.

4. The method of claim 2, wherein said method further includes hashing said smart card PIN using a TPM Extend command to a second PCR.

5. A non-transitory computer recordable medium having a computer program product for providing a secure single sign-on to a computer system, said non-transitory computer recordable medium comprising:
  program code for storing pre-boot passwords in a secure storage area of a smart card;
  program code for encrypting an operating system password to generate a blob, and for storing said blob in a non-secure area of said smart card;
  program code for prompting for a smart card personal identification number (PIN) of said smart card after said smart card has been inserted in said computer system; and
  program code for, in response to a correct smart card PIN entry, utilizing said pre-boot passwords stored in said secure storage area and said operating system password encrypted within said blob to log on to said computer system.

6. The non-transitory computer recordable medium of claim 5, wherein said program code for encrypting further includes program code for encrypting said operating system password using a trusted platform module (TPM) Seal command to a platform configuration register (PCR).

7. The non-transitory computer recordable medium of claim 6, wherein said program code for utilizing further includes program code for decrypting said blob to yield said operating system password.

8. The non-transitory computer recordable medium of claim 6, wherein said computer recordable medium further includes program code for hashing said smart card PIN using a TPM Extend command to a second PCR.

9. A computer system capable of allowing a secure single sign-on, said computer system comprising:
  a smart card reader for prompting for a smart card personal identification number (PIN) of a smart card after said smart card has been inserted in said computer system, wherein said smart card includes a secure storage area for storing pre-boot passwords and a non-secure storage for storing a blob;
  a trusted platform module (TPM) for encrypting an operating system password of said computer system to generate said blob; and
  a processing unit, in response to a correct smart card PIN entry, utilizing said pre-boot passwords stored in said secure storage area of said smart card and said operating system password encrypted within said blob to log on to said computer system.

10. The computer system of claim 9, wherein said TPM encrypts said operating system password using a TPM Seal command to a platform configuration register (PCR).

11. The computer system of claim 10, wherein said processing unit further decrypts said blob to yield said operating system password.

12. The computer system of claim 10, wherein said processing unit further hashes said smart card PIN using a TPM Extend command to a second PCR.

* * * * *